US012465902B2

(12) United States Patent
Roth et al.

(10) Patent No.: US 12,465,902 B2
(45) Date of Patent: Nov. 11, 2025

(54) MICROARRAY TRANSFORMER

(71) Applicant: BioCopy GmbH, Emmendingen (DE)

(72) Inventors: Guenter Roth, Freiburg (DE); Stefan Daniel Kraemer, Bad Krozingen (DE); Johannes Woehrle, Schramberg (DE)

(73) Assignee: BioCopy GmbH, Emmendingen (DE)

( * ) Notice: Subject to any disclaimer, the term of this patent is extended or adjusted under 35 U.S.C. 154(b) by 1121 days.

(21) Appl. No.: 17/054,976

(22) PCT Filed: May 15, 2019

(86) PCT No.: PCT/EP2019/062502
§ 371 (c)(1),
(2) Date: Nov. 16, 2020

(87) PCT Pub. No.: WO2019/219757
PCT Pub. Date: Nov. 21, 2019

(65) Prior Publication Data
US 2021/0213414 A1     Jul. 15, 2021

(30) Foreign Application Priority Data
May 15, 2018 (DE) .................. 10 2018 111 569.5

(51) Int. Cl.
*B01J 19/00*     (2006.01)
*G16B 25/30*     (2019.01)
(52) U.S. Cl.
CPC .......... *B01J 19/0046* (2013.01); *G16B 25/30* (2019.02); *B01J 2219/00585* (2013.01);
(Continued)

(58) Field of Classification Search
None
See application file for complete search history.

(56) References Cited

U.S. PATENT DOCUMENTS 6,103,463 A * 8/2000 Chetverin ............ C12Q 1/6837
435/6.12
6,692,972 B1 * 2/2004 Yershov .................... B81B 1/00
422/63
(Continued)

FOREIGN PATENT DOCUMENTS

WO     2006112815 A2     10/2006
WO     2008022332 A2     2/2008
(Continued)

OTHER PUBLICATIONS

Harini Chandra et al, "Cell-free synthesis-based protein microarrays and their applications", Proteomics 10(4) (first published: Feb. 18, 2010), p. 717-730.
(Continued)

*Primary Examiner* — Brian R Gordon
(74) *Attorney, Agent, or Firm* — Agris & von Natzmer LLP; Joyce von Natzmer

(57) ABSTRACT

The invention relates to a method for microarray transformation, wherein, by using a cavity chip with transformation matrix, a template array can be copied onto a planar support, and the information or spatial arrangement is changed in the process, so that a transformed second array forms. The invention further relates to a device for carrying out such a method.

15 Claims, 13 Drawing Sheets

(52) U.S. Cl.
CPC ............... *B01J 2219/00596* (2013.01); *B01J 2219/00608* (2013.01); *B01J 2219/00722* (2013.01)

(56) References Cited

U.S. PATENT DOCUMENTS

| | | | | |
|---|---|---|---|---|
| 7,807,447 | B1* | 10/2010 | Shoemaker | C12Q 1/6809 435/91.51 |
| 9,068,953 | B2* | 6/2015 | Silbert | B01J 19/0046 |
| 2001/0039014 | A1* | 11/2001 | Bass | C12N 15/1031 702/20 |
| 2002/0159919 | A1* | 10/2002 | Churchill | B05B 1/3053 436/180 |
| 2003/0082604 | A1* | 5/2003 | Swanson | B82Y 30/00 435/7.9 |
| 2003/0148360 | A1* | 8/2003 | Guire | B01J 19/0046 435/7.1 |
| 2003/0148401 | A1* | 8/2003 | Agrawal | B01L 3/5088 435/7.9 |
| 2004/0038388 | A1* | 2/2004 | Yamamoto | B29C 66/61 506/40 |
| 2005/0003458 | A1* | 1/2005 | Moore | G01N 35/1016 435/325 |
| 2006/0141245 | A1 | 6/2006 | Stellacci et al. | |
| 2009/0270273 | A1* | 10/2009 | Burns | C12Q 1/6837 506/17 |
| 2010/0009872 | A1* | 1/2010 | Eid | G01N 33/54313 506/26 |
| 2010/0190654 | A1* | 7/2010 | Rothrock | B01L 3/5085 506/30 |
| 2010/0216656 | A1* | 8/2010 | Lockhart | C12Q 1/6837 506/9 |
| 2010/0256017 | A1 | 10/2010 | Larman et al. | |
| 2011/0172105 | A1* | 7/2011 | Gage | C12N 15/1096 536/23.1 |
| 2011/0172127 | A1* | 7/2011 | Jacobson | C12Q 1/6844 506/26 |
| 2012/0202709 | A1* | 8/2012 | Bergo | B01J 19/0046 506/23 |
| 2014/0038854 | A1* | 2/2014 | Roth | B82Y 30/00 506/40 |
| 2014/0155295 | A1* | 6/2014 | Hindson | C12Q 1/6806 506/4 |
| 2014/0235505 | A1* | 8/2014 | Smith | C12N 15/1068 506/26 |
| 2014/0243224 | A1* | 8/2014 | Barnard | B01J 19/0046 506/26 |
| 2014/0303037 | A1* | 10/2014 | Short | G01N 33/54306 435/402 |
| 2015/0072873 | A1* | 3/2015 | Heinz | C40B 50/14 506/4 |
| 2015/0283531 | A1* | 10/2015 | Jones | B01J 19/0046 506/40 |
| 2017/0260573 | A1* | 9/2017 | Itabashi | C12Q 1/6809 |
| 2017/0312727 | A1 | 11/2017 | Roth | |
| 2017/0369938 | A1* | 12/2017 | Zengerle | C12Q 1/6837 |

FOREIGN PATENT DOCUMENTS

| | | |
|---|---|---|
| WO | 2009034181 A2 | 3/2009 |
| WO | 2010100265 A1 | 9/2010 |
| WO | 2013186359 A1 | 12/2013 |

OTHER PUBLICATIONS

Lin Haohao et al, "Replication of a DNA microarray", (Jul. 23, 2005), J. Am. Chem. Soc. 127(32), p. 11210-11211.

Normann Kilb et al, "Protein Microarray Copying: Easy on-Demand Protein Microarray Generation Compatible with Fluorescence and Label-Free Real-Time Analysis", Chembiochem 20(12) (first published: Feb. 7, 2019).

* cited by examiner

A

B

MICROARRAY TRANSFORMER

CROSS-REFERENCE TO RELATED APPLICATIONS

This is the U.S. national stage of International patent application PCT/EP2019/062502, filed May 15, 2019 designating the United States and claiming priority to German patent application DE 10 2018 111 569.5, filed May 15, 2018, which are incorporated herein by reference in their entireties.

BACKGROUND AND INTRODUCTION TO THE INVENTION

DNA microarrays are understood to mean a collection of multiple different spots with DNA on a solid substrate. In the production of DNA microarrays, a distinction is made in principle between three different production types:
1. Spotted DNA microarrays
   a. Microarray spotter [8]
2. In-situ synthesized DNA microarrays
   a. Spot synthesis; inkjet printing [2], [3]
   b. Photolithography by means of photomasks [10]
   c. Photolithography by means of micro mirrors [9]
3. Synthesis by means of DNA polymerase A relatively new method for producing DNA microarrays consists in synthesizing the DNA on the surface by means of a polymerase using a DNA template (WO2009034181A2, WO2010100265A1). Here, a solid surface is provided with so-called primers (synthesis starting points for the DNA polymerase). Subsequently, a mixture consisting of the individual synthesis components, the DNA polymerase and the template is applied to this same surface. The synthesis here runs highly parallel on up to several thousand spots. The reaction spaces of each of these spots have been physically separated from one another, in order to ensure an independent synthesis reaction. This can represent a spatial separation via microcavities right up to limiting the diffusion.

The basic difference between the production types consists in that the DNA molecules are produced ahead of time for (1) and during the preparation of the DNA microarray for (2 and 3).

In all the aforementioned production techniques for DNA microarrays, the individual arrays are in each case newly prepared, i.e., prepared completely from scratch. For this reason, some approaches exist, the goal of which is to replicate already existing DNA microarrays:

Replication of DNA microarrays by hybridization:

Here, complementary DNA strands from DNA pools are hybridized onto an existing DNA microarray. The complementary DNA molecules in each case have a reactive group, by means of which they can be attached to a second substrate in which the two are brought in contact. This substrate then contains the complementary DNA molecules of the original DNA microarray and has the same spatial resolution. A copy produced in this manner is comparable to the negative of an analog photograph ([4], [5], [6], [11], [12], US20060141245A1, WO2006112815A2).

Replication of DNA microarrays by hybridization and elongation by means of DNA polymerase:

This method is very similar to the above-described method. However, the hybridized DNA molecules are considerably shorter than the DNA molecules of the DNA microarray to be replicated. The hybridized DNA molecules are used in this case as primer for a DNA elongation reaction by means of DNA polymerase. The polymerase is an enzyme which can elongate a DNA strand using a template. By means of this method, it is possible in principle to replicate DNA microarrays with long DNA molecules. A copy produced in this manner is comparable to the negative of an analog photograph ([6], US20100256017A1, WO2008022332A2).

Replication by means of a master cavity chip and a subsequent PCR

A master cavity chip has DNA primer on its surface, which is complementary to the DNA of an already existing DNA microarray. This chip is filled with PCR mixture and placed on the DNA microarray to be replicated. By means of a PCR, the information of the DNA of the DNA microarray is transferred into the master cavity chip and stored. In a second step, the cavity chip is again filled with PCR mixture and an empty microarray plate is put over the chip to close it. Subsequently, a PCR is carried out again in order to transfer the DNA molecules from the master cavity chip to the new surface. This thus represents an exact copy of the original DNA microarray (WO2010100265A1).

In the prior art, no method exists by means of which existing DNA microarrays can be both replicated and also modified (transformed) as desired.

The various methods from the prior art have different disadvantages:

Conventional production types (array production):

Here, a replication of DNA microarrays is not possible. Prepared, generated microarrays can no longer be modified/transformed with these methods. They have to be newly generated from scratch. A subsequent transformation is thus not possible. Spot size and shape are determined by the respective production type and cannot be selected as desired. In addition, the arrangement of the spots is limited by the production type. A transformation of a DNA microarray is not possible with any of the aforementioned methods.

Existing methods for replicating already existing DNA microarrays:

A change of the spot sizes or the specific positions thereof is not possible (no spatial transformations). Likewise, no shape transformations are possible, since the starting array always specifies and predetermines the shape of the spot. In addition, sequence transformations are only possible in the form of elongation or shortening of the existing DNA. Further transformations have not been described. Sequence transformations in the form of merging or combinatorics are not possible with the existing methods.

In the prior art, an array is basically printed as by a printer during a copying process. For each different DNA spot, an individual DNA sample must be used, which requires a lengthy preparation. Thereby, the process becomes time consuming and cost intensive. In addition, a lengthy washing between the printing processes is necessary in order to prevent and reduce contamination between spots. Moreover, it is necessary to select the spacing of the spots to be sufficiently large in order to prevent running together and mutual contamination.

An additional disadvantage of the methods from the prior art is that the shape of the spots is very limited, and only approximately circular spots are possible.

The drying of the liquid spots has an effect on the homogeneity of the spots, resulting in a difference in the result between marginal area and middle of the spot.

Light Synthesis

An array is produced by means of photolithography. This results in the following problems.

Each synthesis step requires an individual mask and elongates the DNA strand by only one base. For each step, there is a certain percentage of errors. As a result, the length of the DNA strand has an effect on the quality of the result. After each synthesis step, a washing step must be carried out and the mask must be exchanged, as a result of which the method becomes time consuming and cost intensive. The design of an array can be changed only at high cost and time expenditure.

Maskless lithography with micro mirrors, as in a projector/beamer, in fact renders the use of different masks obsolete, but as a result the shape of the spot is limited to rectangular or square shapes.

Solid Phase PCR

DNA is distributed digitally and randomized in a glass cavity chip and replicated by means of PCR. The production of the glass cavity chip is very elaborate; in addition, the patterns and spot shapes are limited by the production to circular and hexagonal arrangements. Moreover, multiple different cavity shapes on one array are not possible. Operations such as enlargement and reduction are not possible with this method. It is also not possible to shift or merge spots. A transformation of arrays is therefore ruled out.

To date, in the prior art, no method is known or has been described by means of which DNA microarrays can be transformed. Only replication types have been described. However, the transformation of microarrays opens unimagined and unforeseen possibilities such as, for example, the production of completely new DNA arrays.

The challenge or the aim here is to store and modify the information of the original microarrays. While the storage can usually be implemented satisfactorily, the accompanying transformation represents a major challenge.

Microarrays from the prior art, after they have been produced, can no longer be changed, except for possible elongation or shortening. However, due to the poor quality of the primary DNA, this is often also only possible to a limited extent. Moreover, existing formats of microarrays cannot be "reformatted" purely physically, i.e., the experiments and devices always have to be adapted to the existing microarrays, or experiments have to be relinquished if matching microarrays are not available. In addition, two microarrays cannot be "assembled" to form one microarray after their production.

BRIEF SUMMARY OF THE INVENTION

The aim is achieved by the independent claims. Advantageous embodiments result from the dependent claims.

In a first preferred embodiment, the invention relates to a method of microarray transformation comprising the following steps
a) provision of a template array, wherein the template array comprises multiple spots with template molecules, and wherein the template molecules are preferably oligonucleotides,
b) provision of a cavity chip comprising a transfer matrix,
c) provision of a reaction mixture in the cavity chip,
d) placement of the template array on the cavity chip,
e) copying process, wherein the oligonucleotides of the spots of the template array are copied onto the cavity chip
f) provision of an array surface,
g) provision of a reaction mixture in the cavity chip,
h) placement of the array surface on the cavity chip,
i) copying process, wherein the oligonucleotides of the spot of the cavity chip are copied onto the array surface as DNA, RNA or protein, and wherein this newly formed additional array differs from the template array in terms of spot shape, spot size, spot position and/or in terms of the information contained.

By means of the invention, a microarray which is transformed in comparison to a starting array is thus produced.

Transfer matrix is understood to be the arrangement of the cavities and their design as well as their properties.

It can be preferable to prestore the reaction mixture and/or other reaction components in the cavity chip.

In order to transform DNA microarrays, a special method was thus developed, in which the replication and transformation can occur in one or more steps. Special cavity chips having any desired shape can be generated. They comprise small cavities with a specific shape, in which the template molecules of the original microarray can be stored.

In this sense, "stored" is understood to mean that the information of the template molecule has been transferred in a lasting manner. This can occur in the form of 1:1 copies of the template molecules. However, transformations are also possible, for example, RNA to cDNA, wherein the sequence information is maintained. The original template molecules or some of them can also be transferred to the cavity chip.

It is preferable that an original oligonucleotide microarray (particularly preferably a DNA microarray) having a first geometry is transferred into a cavity chip having a second geometry. The transfer can preferably occur by means of a PCR. However, other methods by means of which biomolecules such as, for example, DNA, can be amplified, are also possible here, for example, isothermal DNA amplification, HDA, RPA or LAMP. The selection of the primers during this transfer reaction, also referred to as copying process in the sense of the invention, additionally determines which spots of the original arrays are transferred. Accordingly, the second geometry of the cavity chip can be transferred to a planar support, also referred to as array surface, whereby a $2^{nd}$ order microarray forms. Then, an additional transformation step can be carried out, in a cavity chip having a third geometry, whereby a $3^{rd}$ order array then forms. In principle, it is thus possible to newly resort the original microarray step by step in any desired order.

In the sense of the invention, "copying" means both the 1:1 copy (that is, for example, DNA to DNA) as well as other methods in which the information is copied but the product differs from the starting molecule, that is to say, for example, DNA to protein, RNA to cDNA, RNA to protein, or DNA to RNA. A product molecule which differs from the starting molecule is also referred to as derivative. Any derivatives of the starting molecule are possible, and the person skilled in the art knows how to produce the respective product molecule.

The copying steps are preferably carried out with known means from the prior art; however, they can also be replaced by alternative methods which generate the same or a similar biochemical reaction or amplification. It is preferable to use an RNA polymerase for the transformation of DNA to RNA. A reverse transcriptase is preferably used for the transformation of RNA to cDNA. For the transformation of DNA and/or RNA into proteins, preferably cell-free in-vitro transcription and/or translation mixtures are used. If DNA is to be copied to DNA, polymerases, RPA (replication protein A) or a system for helicase-dependent amplification (HDA) can be used.

A typical transformation process preferably occurs as follows:
- filling of the cavity chip with a reaction mixture, for example, PCR mixture or cell-free expression system (step 1),
- placement of the original array on the cavity chip (step 2),
- performance of a copying reaction, for example, a PCR (step 3),
- washing and blocking (step 4).
- optionally: modification of the template molecules in the cavities,
- optionally: repetition of steps 1-4 with the same cavity chip but another original microarray,
- filling of the cavity chip with reaction mixture and closing thereof with an empty array surface,
- performance of a copying reaction, for example, a PCR,
- washing and blocking of the newly produced arrays and of the cavity chip.

In particular, the optional steps can be merged with one another in any desired manner. The produced shape of the resulting transformed spot is given here by the shape of the cavity of the cavity chip. In particular, the above-described process can also be used multiply and again on already transformed arrays.

The spatial arrangement, that is to say, for example, the resulting pattern, is preferably defined by the first step of copying into the cavity chip. However, a modification of the molecule can also occur even thereafter, so that a transformation of the information can occur at multiple times.

Also preferred is the method wherein a modification, elongation, shortening, derivatization and/or inversion of the molecules in the cavities of the cavity chip and/or during the copying process occurs. Derivatization is understood to mean the transformations of the starting molecule, wherein the information, for example, sequence information, is maintained. In the sense of the invention, this also includes the translation of DNA or RNA into peptide sequences.

It is particularly preferable that steps a) to e) are repeated at least once, wherein one uses the same cavity chip but a different template array or the same template array in a different or in the same orientation.

When the same template array is copied multiply into the same cavity chip, it is particularly advantageous that template array and cavity chip during the repetitions are arranged in a changed orientation with respect to one another. This can occur, for example, by rotation of the cavity chip. The orientation can also remain the same, for example, in order to obtain synergistic effects.

It is particularly preferable that the copying step comprises an amplification step.

The amplification can be a PCR, an isothermal amplification or an RT-PCT. However, the amplification step can also describe a transcription or protein expression.

It is preferable for the reaction mixture to be a PCR mixture, an isothermal amplification mixture, a reverse transcription mixture, a transcription mixture, or a cell-free expression mixture.

In addition, it is preferable for a protein synthesis to occur, so that, for example, enzymes are obtained in the reaction mixture, which transcribe DNA into RNA or translate RNA into protein.

Here, it is preferable that a possible protein synthesis occurs only then in a step of copying from the cavity chip onto an empty array surface.

Other adequate mixtures can also be used, wherein the person skilled in the art can select them without taking an inventive step in the process.

Particularly preferably, the template molecules are oligonucleotides, preferably DNA molecules or RNA molecules.

In addition, it is preferable to merge several spots of the template array in the cavity chip and/or additional array, in order to generate in this manner a mixture of template molecules or molecules derived therefrom and/or to generate a DNA or RNA comprising multiple sequences or derivatives of said partial sequences of the template molecules from the respective spots.

Moreover, it is preferable to merge the spots of at least two template arrays in the additional array, in order to generate in this manner a mixture of copies and/or in order to generate a copy comprising multiple partial sequences or derivatives of said partial sequences of the template molecules from the respective spots.

In an additional preferred embodiment, the invention relates to the method wherein a spot of the template array is subdivided in the additional array into multiple spots.

It is also preferable to add additional DNA molecules in solution, so that the molecules (template molecules or product molecules or an intermediate product) are elongated or modified by this DNA sequence.

It is particularly preferable for the template molecules to be DNA molecules, all or some of which have short identical DNA sequences of preferably 10-30 base pairs.

Methods according to at least one of the preceding claims, wherein the cavities of the cavity chip are coated with primers.

Preferably, the primers on the 3' end or on the 5' end carry an additional DNA sequence.

The method wherein the additional sequences can be used as barcode for position information and/or the primers can contain a sequence for the transcription and/or the cell-free synthesis is preferable.

It is preferable for the transformation to be spatially and/or temporally limited. The spatial limitation is preferably given by the margin of the cavities. The temporal limitation can be brought about by different factors. Temporally limited reaction conditions can be, for example, a temperature which may not be exceeded or undershot, a pH value which changes over the course of time, the irradiation of light or electrical fields.

Various and Preferred Embodiments of the Invention

The invention makes it possible to change existing microarrays with regard to their spatial structure, in particular with regard to spot shape, spot size and spot position. It is possible to change the shape of the spots as desired, or else their position (right up to removing spots). Depending on the geometry, this can have different applications:
a) In the case of a transformation without relevant size changes, a spot is transformed into a spot having approximately the same size, or else the shape of the spot can be changed as desired in the process. Due to the transformation process, extremely sharp edges form, and in this way spots having heretofore impossible geometries can be generated.
b) In the case of a transformation into smaller sizes, a spot can be "divided" into multiple small spots, which in turn can have any desired shape.
c) In the case of a transformation into larger sizes, two or more spots or the DNA thereof can be fused. Here, depending on process selection and primer sequence, the DNA can be copied in parallel or sequentially on the target spot. That is to say, in the end the DNA can then be a mixture on the surface (several sequences juxtaposed on the surface) or else also a combination construct, in which one sequence is attached to the other sequence, whereby completely different gene products can also be generated.

By multiple performance of transformations, a microarray can be reformatted theoretically as desired, spots can be removed or added from other arrays, DNA or other biomolecules can be shortened or elongated. One advantage of the invention is that it is possible thereby to combinatorially construct or reformat gene constructs or gene libraries.

It was entirely surprising that it became known as a result of the invention that the static shape of the original microarray can be changed and reformatted by means of transformation via a cavity transfer and reformatted. Analogously to a Fourier transformation, by means of the invention, in principle, any desired geometry can be generated. Affine or partially affine mapping from mathematics can then be applied to the geometry of an array and the biomolecules thereof. Likewise, additions by DNA or other biomolecules can occur (for example, by means of a ligation or an elongating amplification) as can subtractions (for example, by a PCR with a primer which generates a shortened DNA product, or by means of a reaction enzyme which cuts the DNA at a certain sequence). Thus, the abstract and theoretical transformation of mathematics now also becomes possible for physical DNA- or RNA-based microarrays.

The advantages of a $1^{st}$ order transformation (performance of a first transformation) are multiple. Thus, for example, a microarray can be replicated in a desired spot shape. To date, arrays have been "circular" as a result of production. By means of the invention, any desired structures are possible. Thus, for example, it has been possible to produce in a $1^{st}$ order transformation array of hexagons (compare also FIG. 1) and then to convert the array again into circles in successive transformations. The same could also be shown the other way around. Moreover, conventionally produced microarrays are always inhomogeneous within the individual spots due to the production process. The transformation process of the invention, on the other hand, is homogeneous over the entire surface, whereby very homogeneous spots with very precise and almost any geometry are formed. Therefore, one application lies in improving the quality of arrays. Thus, microarray producers can produce a master array and then use the transformation in order to generate geometrically high-quality homogeneous $1^{st}$ order arrays. Here, the geometric quality of the master array is low, only the DNA quality is high, which leads to $1^{st}$ order arrays of high quality and geometry or structure.

An additional advantage is that multiple spots can be merged, so as to generate a mixture of biomolecules such as DNA (2 or more species per spot) or a construct (for example, fusion DNA) on the spot. A corresponding representation is shown in FIG. 2.

An additional advantage consists in that a spot can be cut up into multiple small spots. This enables more precise measurements, greater homogeneity, better binding kinetics (according to Ekins, Ambient Analyte Theory), and thus a higher signal yield.

In addition to the starting array, the transformation process requires only one cavity chip, a small amount of reaction mixture, for example, PCR mixture (as a rule between 5 and 10 µL) and a copy surface on which the $1^{st}$ order array is applied. Thereby, the production of unique geometries (not technically feasible to date) becomes possible. In addition, geometries that were admittedly technically feasible to a limited extent in the past are now produced substantially more cost effectively. The production of a plurality of replications is now also possible without problem. The reformatting of any desired geometries, which was not technically feasible to date, by means of geometric transformation corresponding to an affine mapping in mathematics (shear, stretch, rotation, shear stretch) or by application of these operations to partial regions or individual spots only, constitutes an additional advantage of the invention which allows a plurality of possible uses.

It can also be preferable that the device comprises a set of transformation matrixes in the form of cavity chips which, depending on an order of their use, generate an affine mapping of the array. This means, for example, that the device can have various individual matrixes (on corresponding cavity chips), wherein one matrix shifts, another one enlarges, and the next reduces. It is also possible, for example, that everything is always enlarged/reduced to the same size, then shifted, and then everything is again brought back to the former size. This set of transformation matrixes is then a set of individual operations which can be mutually substituted. As in mathematical affine mapping, in other words, a point reflection can be carried out as reflection followed by a 180° rotation.

In addition, it is preferable to use the transformation method for producing DNA, RNA or proteins 1. Preferably, it is possible to generate new DNA combinations.

In an additional preferred embodiment, the invention relates to a device for carrying out a transformation according to the invention, comprising a cavity chip comprising a transfer matrix, at least one template array, and at least one array surface.

Here, it is preferable that the transfer matrix spatially limits the reaction. This occurs in particular by the cavities and their margins.

In a particularly preferred embodiment, the invention relates to a cavity chip for carrying out a transformation method of the invention.

The following specifications are particularly suitable for the cavity chips. These specifications can be applied both to the claimed method and also to the claimed device.

It is particularly preferable that the cavities of the cavity chip comprise a volume of less than 100 nL. Volumes of less than 50 nL are particularly preferable, and volumes of less than 20 nL are most particularly preferable. It was surprising that particularly good results could be achieved also with volumes in the picoliter range.

However, the person skilled in the art knows that, for certain uses, larger cavities can be advantageous, for example if cells or tissues are used as starting material.

The shape of the cavities can be selected as desired. Circular, hexagonal or triangular shapes are possible. However, in principle, any desired shape can be used.

The following specifications have achieved particularly good results in tests:

| 4000-well | |
| --- | --- |
| Dimensions (L/W/H) | 75 mm/25 mm/2 mm on backbones |
| Cavities | 4104 |
| Diameter | 150 micrometers |
| Spacing | 50 micrometers |

-continued

| | |
|---|---|
| Volume of a cavity | 530 picoliters |
| Cavity depth | 30 micrometers |
| NGS | |
| | |
| Dimensions (L/W/H) | 75 mm/25 mm/2 mm on backbones |
| Cavities | 31672 |
| Diameter | 50 micrometers |
| Spacing | |
| Volume of a cavity | 58.9 picoliters |
| Cavity depth | 30 micrometers |
| 1188-well | |
| | |
| Dimensions (L/W/H) | 75 mm/25 mm/2 mm on backbones |
| Cavities | 1188 |
| Diameter | 300 micrometers |
| Spacing | 50 micrometers |
| Volume of a cavity | 2.12 nanoliters |
| Cavity depth | 30 micrometers |
| 130-well | |
| | |
| Dimensions (L/W/H) | 75 mm/25 mm/2 mm on backbones |
| Cavities | 130 (honeycombed) |
| Diameter | 500 micrometers |
| Spacing | 250 or 134 micrometers |
| Volume of a cavity | 18.5 nanoliters |
| Cavity depth | 30 micrometers |
| 500-well | |
| | |
| Dimensions (L/W/H) | 75 mm/25 mm/2 mm on backbones |
| Cavities | 476 |
| Diameter | 500 micrometers |
| Spacing | 50 micrometers |
| Volume of a cavity | 5.89 nanoliters |
| Cavity depth | 30 micrometers |

Examples and Figures

Below, the invention is explained in reference to figures and examples, without thereby being limited to said figures and examples.

Example 1: Sequence, Shape and/or Spatial Transformation

A) SeqT Addition of Different Information Per Spot
Step 1:
Two primary arrays form the starting point. Here, the two arrays can have identical or different spot sizes, symmetries and spacings. The orientation of the DNA molecules on the surface and the length of the DNA play no role here. The only common feature of the two arrays is that all the DNA molecules must have an identical, short homologous DNA sequence of approximately 10-30 base pairs, a so-called overlap region.
Step 2:
First, by means of a transfer chip and a conventional PCR mixture, a scan of one of the primary arrays is produced by means of PCR. After a completion of the PCR, the same DNA species which are also present on the starting DNA microarray are present in the transfer chip. Their spatial arrangement has also been maintained. Thereby, the spatial information as well as the content information of the primary array has thus been transferred into the transfer chip.
Step 3:
This transfer chip is subsequently placed on the second primary array. Again, a scan is performed by means of a standard PCR mixture. Due to the homologous sequences of the two original DNA microarrays, two scenarios are then conceivable. If a DNA spot of the second microarray encounters a still empty cavity, then the DNA molecules, as already in the first scan, are transferred directly into this cavity. However, if the DNA spot encounters a cavity in which the DNA of the first starting array is already present, then the two DNA strands are fused together on the cavity surface. New DNA molecules form, which carry both the information of the first DNA microarray and also information of the second original DNA microarray.
Step 4:
The stored information in the form of fused DNA molecules or original DNA molecules of the transfer chip can be copied by means of PCR and a standard PCR mixture onto a new, empty, specially functionalized surface.
B) SeqT Addition of Identical Information Per Spot
With this step, identical DNA sections can be added or optionally removed over the area or in a plurality of spots. The introduction over the area can occur by means of an array which has considerably larger structures than the transfer matrix, or over the entire transfer matrix if the DNA by which the elongation is to take place is introduced directly in solution.
Step 1:
A primary array which contains a certain number of different DNA molecules is used. The spot size, symmetry, spacings, quantity play no role here, nor does the orientation of the DNA molecules on the surface.
Step 2:
In order to carry out the subsequent scan, a selection can be made between two different transfer chips:
  i) A transfer chip which has been coated only with the primers necessary for the subsequent PCR.
  ii) A transfer chip in which, on the 5' end of the primer sequence, an additional DNA sequence of any desired length is present.
Moreover, an additional DNA sequence can be introduced, in that said sequence is added in solution, so that the entire transfer area is elongated or changed by this DNA sequence.
First, by means of a transfer chip and a conventional PCR mixture, a scan of one of the primary arrays is produced by means of PCR. After completion of the PCR, the same DNA species which are also present on the starting DNA microarray are present in the transfer chip. Their spatial arrangement is also maintained. Thereby, both the spatial information and the content information of the primary array have thus been transferred into the transfer chip.
Step 3:
The transfer chip is then filled with fresh DNA mixture and a template which has homologous sequences to the already present DNA molecules. This template is added in excess, so that said template cannot become depleted in the subsequent fusion PCR. The cavity chip is then closed by a non-functionalized surface, and then a standard PCR is carried out.
Step 4:
The stored information in the form of DNA molecules of the transfer chip can be copied by means of PCR and a standard PCR mixture onto a new, empty, specially functionalized surface.
C) SeqT Subtraction
Step 1:
A primary array containing a certain number of different DNA molecules is used. The spot size, symmetry, spacings, quantity play no role here, nor does the orientation of the DNA molecules on the surface.
Step 2:
First, by means of a transfer chip and a conventional PCR mixture, a scan of one of the primary arrays is produced by means of PCR. The DNA of the primary array can here be transferred into the transfer chip by means of PCR by the selection of the primers used in full length or partial length. The spatial information is completely maintained.

Step 3:

The stored information in the form of DNA molecules of the transfer chip can be copied by means of PCR and a standard PCR mixture onto a new, empty, specially functionalized surface.

d) ST Zoom

Step 1:

A primary array containing a certain number of different DNA molecules is used. The spot size, symmetry, spacings, quantity play no role here, nor does the orientation of the DNA molecules on the surface.

Step 2:

First, by means of a transfer chip and a conventional PCR mixture, a scan of one of the primary arrays is produced by means of PCR. Here, the geometry and arrangement of the transfer chip are selected so that said transfer chip is identical to those of the starting microarray. Thereby, in each case one DNA spot of the starting array is placed under an individual cavity. The cavity diameter is selected so that the cavity is either greater or smaller than the DNA spot of the primary array. After completion of the PCR, the spatial and content information of the original DNA spot is transferred into a respective cavity of the transfer chip.

Step 3:

The stored information in the form of DNA molecules of the transfer chip can be copied by means of PCR and a standard PCR mixture onto a new, empty, specially functionalized surface.

e) ST Rotation

Step 1:

A primary array containing a certain number of different DNA molecules is used. The spot size, symmetry, spacings, quantity here play no role, nor does the orientation of the DNA molecules on the surface.

Step 2:

First, by means of a transfer chip and a conventional PCR mixture, a scan of one of the primary arrays is produced by means of PCR. After completion of the PCR, the same DNA species which are also present on the starting DNA microarray are present in the transfer chip. Their spatial arrangement has also been maintained. Thereby, both the spatial information and the content information of the primary array has thus been transferred into the transfer chip.

Step 3:

The transfer chip is rotated by a certain angle and around a certain point.

Step 4:

The stored information in the form of DNA molecules of the transfer chip can be copied by means of PCR and a standard PCR mixture onto a new, empty, specially functionalized surface.

F) ST Shift

Step 1:

A primary array containing a certain number of different DNA molecules is used. The spot size, symmetry, spacings, quantity here play no role, nor does the orientation of the DNA molecules on the surface.

Step 2:

First, by means of a transfer chip and a conventional PCR mixture, a scan of one of the primary arrays is produced by means of PCR. After completion of the PCR, the same DNA species which are also present on the starting DNA microarray are present in the transfer chip. Their spatial arrangement has also been maintained. Thereby, both the spatial information and the content information of the primary array has thus been transferred into the transfer chip.

Step 3:

The transfer chip is shifted by a certain length in x or y direction.

Step 4:

The stored information in the form of DNA molecules of the transfer chip can be copied by means of PCR and a standard PCR mixture onto a new, empty, specially functionalized surface.

G) ST Merging

Step 1:

A primary array containing a certain number of different DNA molecules is used. The spot size, symmetry, spacings, quantity here play no role, nor does the orientation of the DNA molecules on the surface.

Step 2:

First, by means of a transfer chip and a conventional PCR mixture, a scan of one of the primary arrays is produced by means of PCR. Here, the structure of the transfer chip is selected so that any desired number of spots of the primary array is transferred into the same structure of the transfer chip. The biomolecules are as a result not fused but rather are only mixed in the same structure. After completion of the PCR, the mixtures or individual DNA species are present in the structures of the transfer chip.

Step 3:

The stored information in the form of DNA molecules of the transfer chip can be copied by means of PCR and a standard PCR mixture onto a new, empty, specially functionalized surface. The secondary array obtained then consists of mixed spots. Depending on the selection of the structure of the transfer chip, individual monoclonal spots can still be present.

H) ST Resolution

Step 1:

A primary array containing a certain number of different DNA molecules is used. The spot size, symmetry, spacings, quantity play no role here, nor does the orientation of the DNA molecules on the surface.

Step 2:

First, by means of a transfer chip and a conventional PCR mixture, a scan of one of the primary arrays is produced by means of PCR. Here, the structure of the transfer chip is selected so that more or fewer structures are present compared to the primary array. After completion of the PCR, for example, a spot of the primary array has then been transferred into multiple smaller structures of the transfer chip (higher resolution), or multiple spots of the primary array have been transferred into a larger structure of the transfer chip (lower resolution).

Step 3:

The stored information in the form of DNA molecules of the transfer chip can be copied by means of PCR and a standard PCR mixture onto a new, empty, specially functionalized surface. The secondary array obtained then consists of more or fewer spots compared to the primary array.

i) ShaT

Step 1:

A primary array containing a certain number of different DNA molecules is used. The spot size, symmetry, spacings, quantity play no role here, nor does the orientation of the DNA molecules on the surface.

Step 2:

First, by means of a transfer chip and a conventional PCR mixture, a scan of one of the primary arrays is produced by means of PCR. Here, the structure of the transfer chip is selected so that they have a different shape from that of the spots of the primary array (for example, stars or elongate spots). After completion of the PCR, the same DNA species which are also present on the starting DNA microarray are present in the transfer chip. Their spatial arrangement has also been maintained. Thereby, both the spatial information and the content information of the primary array has thus been transferred into the transfer chip.

Step 3:

The stored information in the form of DNA molecules of the transfer chip can be copied by means of PCR and a standard PCR mixture onto a new, empty, specially functionalized surface. The secondary array obtained now consists of spots having a different shape compared to the primary array.

BRIEF DESCRIPTION OF THE FIGURES

FIG. 4: Position optimization
Problem: Microarrays are printed, i.e., tiny drops are put on a surface and after that are of different size (A), not precisely in position (B) or inhomogeneous or have an irregular shape (C), etc. That is to say, the automated acquisition of the spots is difficult.
Solution: a transformation containing the optimal spatial position is carried out.

FIG. 5: Structure optimization
Problem: Microarrays are printed, i.e., the drops usually have circular to oval shapes and then any desired structures can then be generated.
Solution: A transformation is carried out, which gives an individual shape to each spot, including shapes which to date could not be produced.

FIG. 6: Reduction 1
Problem: The format of arrays is established by the printing process, i.e., there is a lower limit of the size of the spots due to the minimal deposition quantity, and likewise of their spacing in order to prevent running together of the spots.
Solution: Smaller spots can then be generated in the transformation.

FIGS. 7 and 8: Reduction 2a and 2b
Problem: The format of arrays is established by the printing process, i.e., there is a lower limit of the size of the spots due to the minimal deposition quantity, and likewise of their spacing in order to prevent running together of the spots.
Solution: Two transformations are carried out, one which "contracts" everything and then one which makes smaller spots.

FIG. 9: Enlargement 1
Problem: The format of arrays is established by the printing process, i.e., there is an upper limit of the size of the spots due to the maximum deposition quantity and concentration.
Solution: larger spots can then be generated in the transformation.

FIGS. 10, 11 and 12: Enlargement 2a, 2b and 2c Problem: The format of arrays is established by the printing process, i.e., there is an upper limit of the size of the spots due to the maximum deposition quantity and concentration.
Solution: in a first transformation, the spots are spaced, then they are first reduced (!), in order to prevent contaminations, and then enlarged.

FIGS. 13 and 14: Position interchange a and b
Problem: The format of the array is established after the printing; a change in position automatically requires a new printing.
Solution: In a first transformation, the positions are interchanged, and, in a second transformation, the spot geometry is then reestablished.

FIG. 15: Merging
Problem: The DNA of individual spots cannot be fused or mixed later in order to thus bring about additive effects (for example, when two DNAs initially jointly interact with a protein) or allosteric effects (when a DNA is necessary in order to activate a protein or is activated by said protein, which then binds to another DNA, for example, initiation sequences or the lac-promoter or lac-repressor).
Solution: Two or more spots can be fused, and the DNAs can be next to one another or linearly one after the other.

FIG. 16: Division
Problem: Spots cannot be reduced again later, for example, in order to achieve a higher signal (under unsaturated conditions) or more rapid kinetics (ambient analyte theory).
Solution: In the transformation, the spot is divided into smaller spots FIG. 17: Combinatory mixture
Problem: The generation of multiple DNA spots which, however, carry identical partial sequences is just as elaborate as the generation of completely incoherent sequences.
Solution: First, the DNA is removed from template 1, then it is removed from template 2 resulting in the generation of a combinatory mixture. Thus, with n and m spots on the original array, it is possible to generate a total of n*m combinatory mixtures.

A mixture can be implemented both as a juxtaposition (multiple DNA sequences are next to one another on the surface) and as abutting (the DNA sequences are linearly joined together one after the other, that is to say elongated). This can be implemented by selection of the primers and DNA sequences during the biochemical amplification step (all primers identical=usually next to one another, and primers matched=usually abutting=usually elongation PCR).

FIGS. 18 to 22 show particularly preferable devices of the invention.

Figure 1:
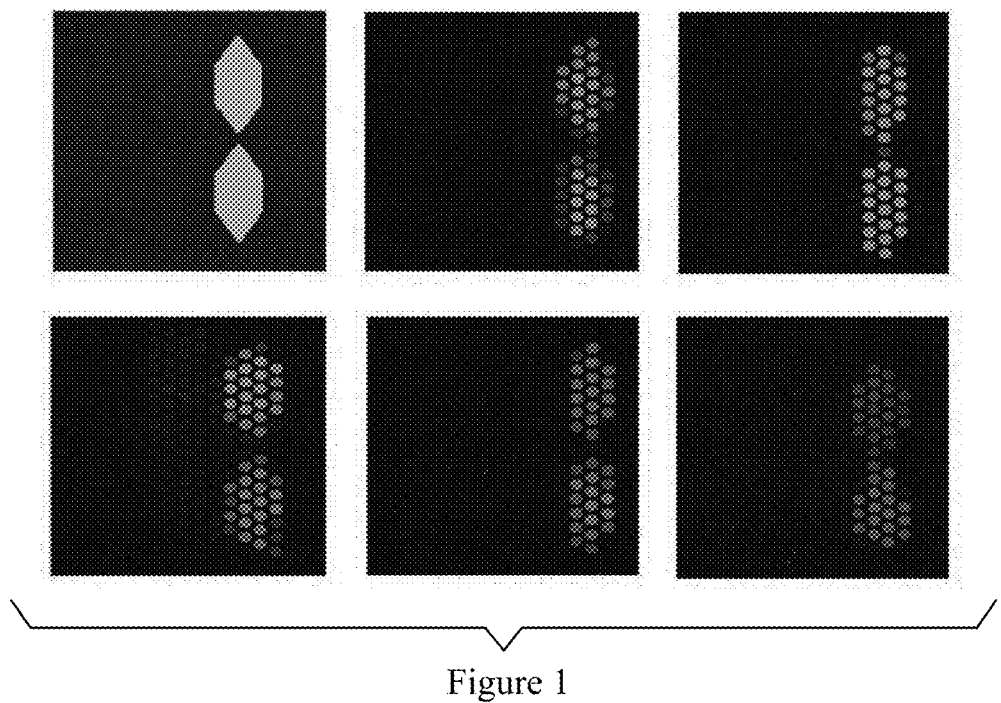
FIG. 1. Regressive transformation (large to small). An array of hexagons has been transformed into smaller circles. The figure shows a section of 2 hexagons.
Figure 2:
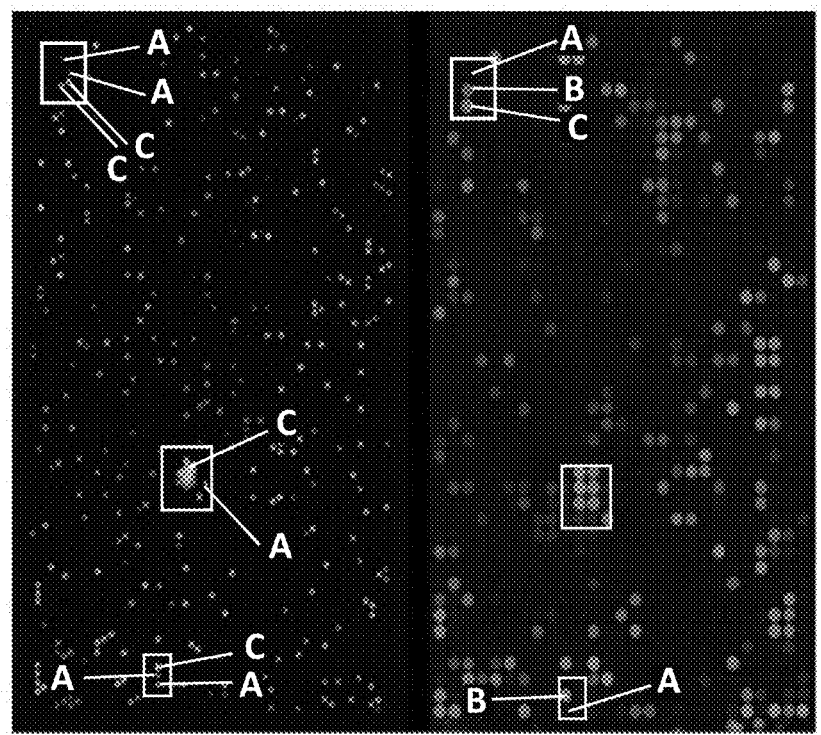
FIG. 2. Progressive transformation (small to large) The array on the left with clearly larger cavities has been transformed into an array with large spots (right). Depending on the precise position of the original spots, different products can be generated here. In the example of the lower box, the lower red spot (A) has been transformed into a red circle (A) with clearly larger diameter. But the red spot (A) above has been fused with the overlying green spot (C) to form a yellow circle (B). Directly above this box, a green spot (left small, right large) is located, which in turn has been transformed in pure form. In the case of the top left box, 2 green (C) and 2 red spots (A) (left) were converted into a traffic light configuration (red (A), yellow (B), green (C) (right)).
Figure 3:
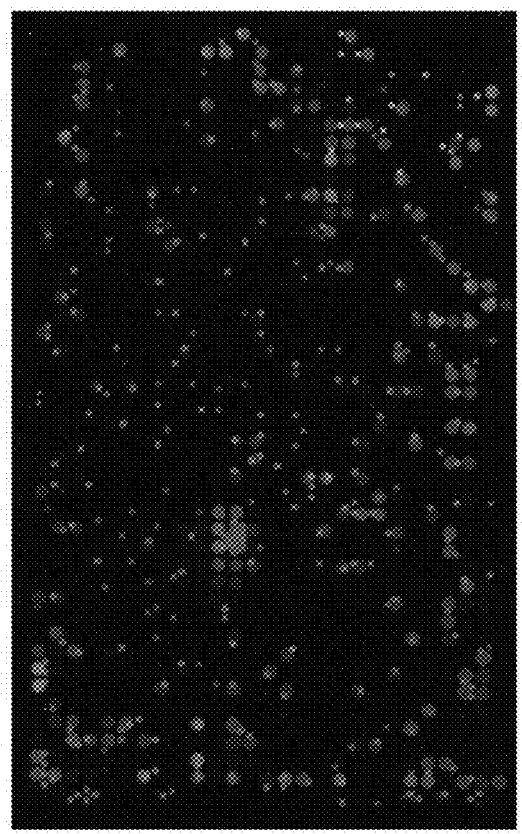
FIG. 3. Allocation of the transformation The data from FIG. 2 has been superimposed here in order to represent the transformation more clearly. One can now see very well which small spots contributed as seeds of the larger spots. Some of the small red spots generated no signal in this experiment. For the green spots, a considerably clearer: allocation exists.
Figure 4:
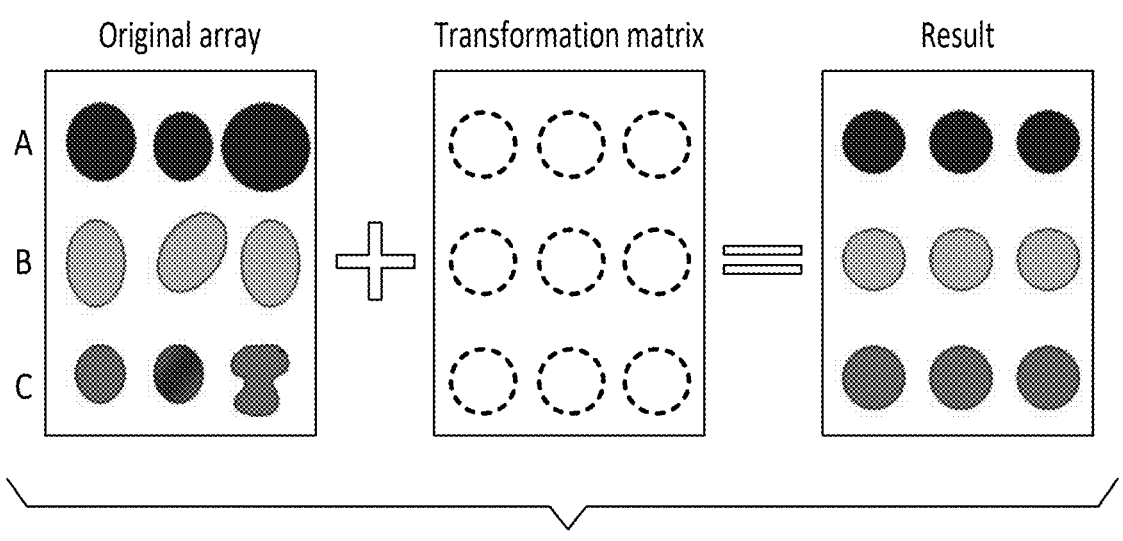
FIGS. 4 to 17 particularly preferred embodiments of the invention.
Figure 5:
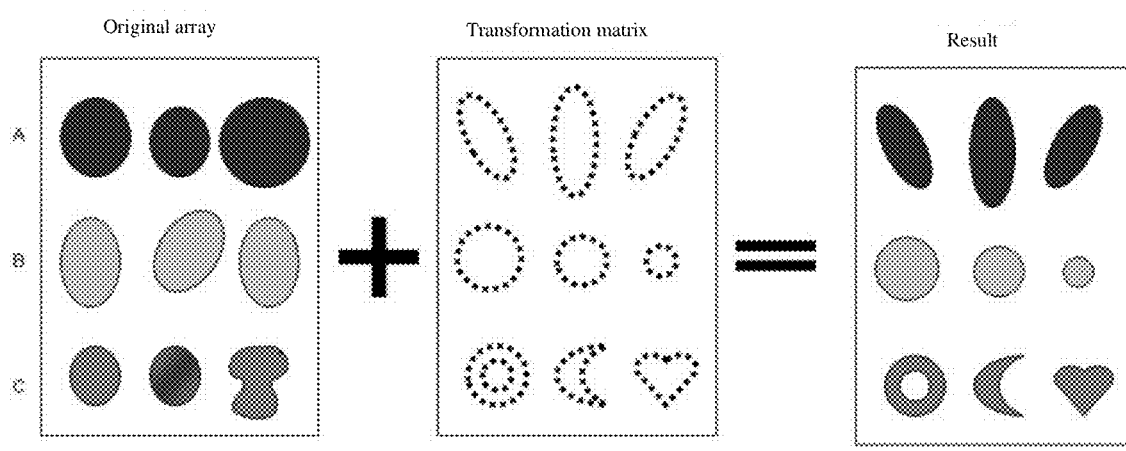
Figure 6:
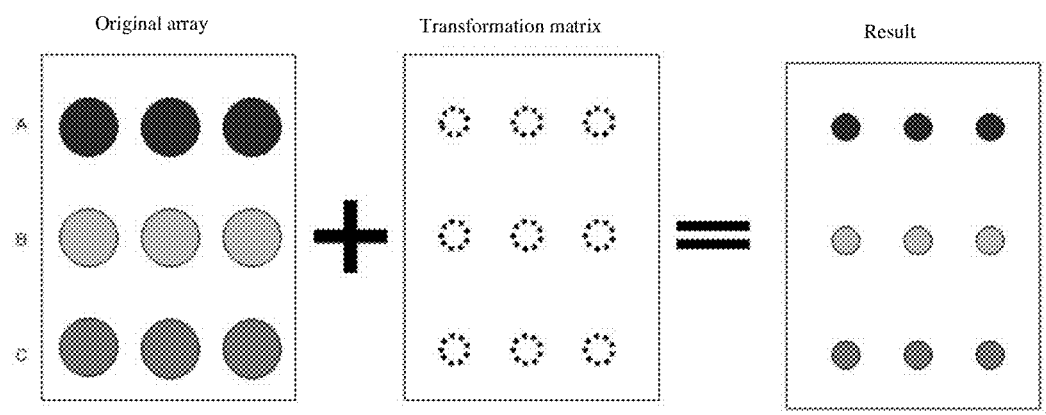
Figure 7:
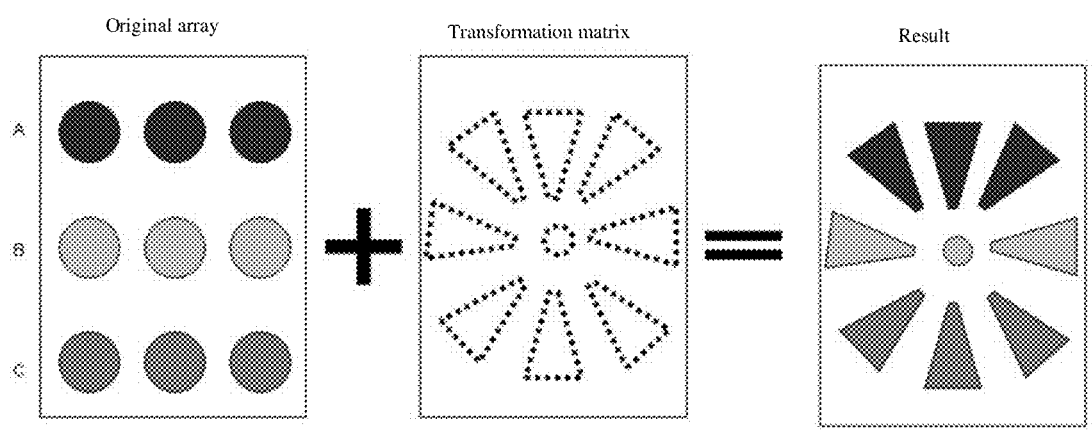
Figure 8:
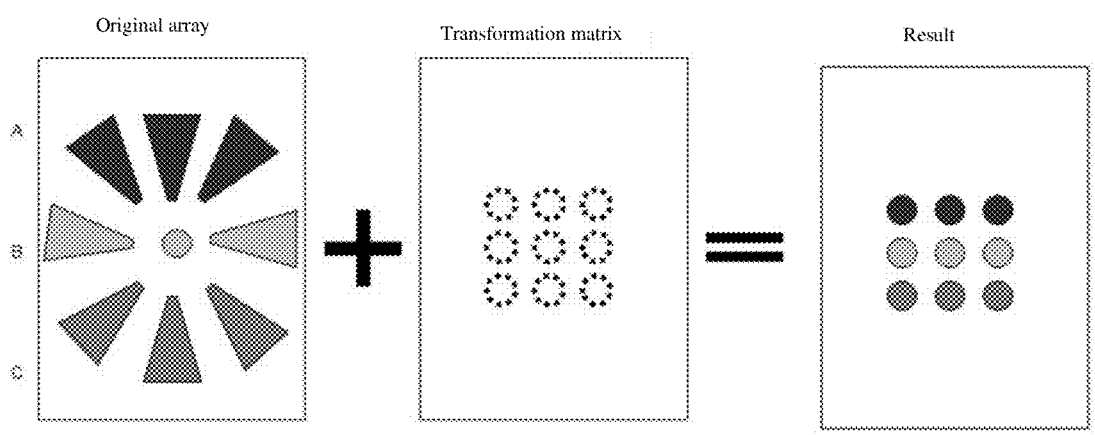
Figure 9:
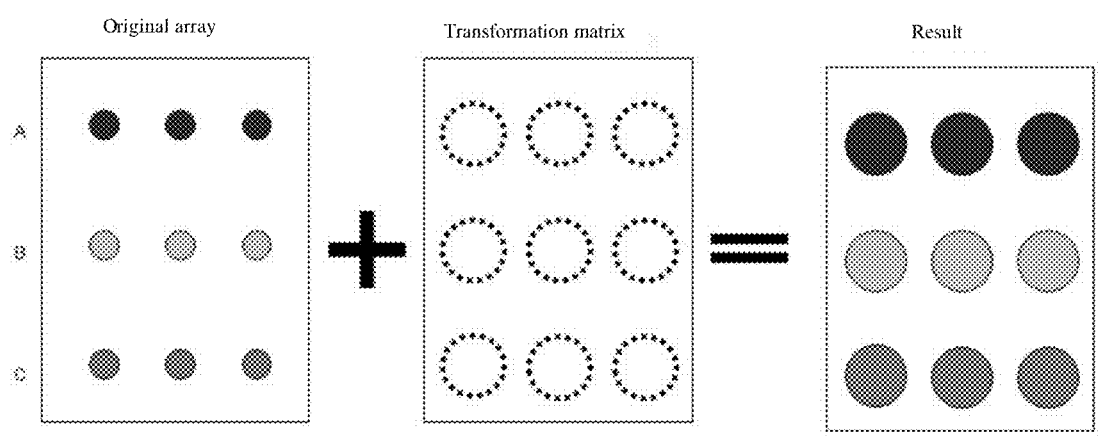
Figure 10:
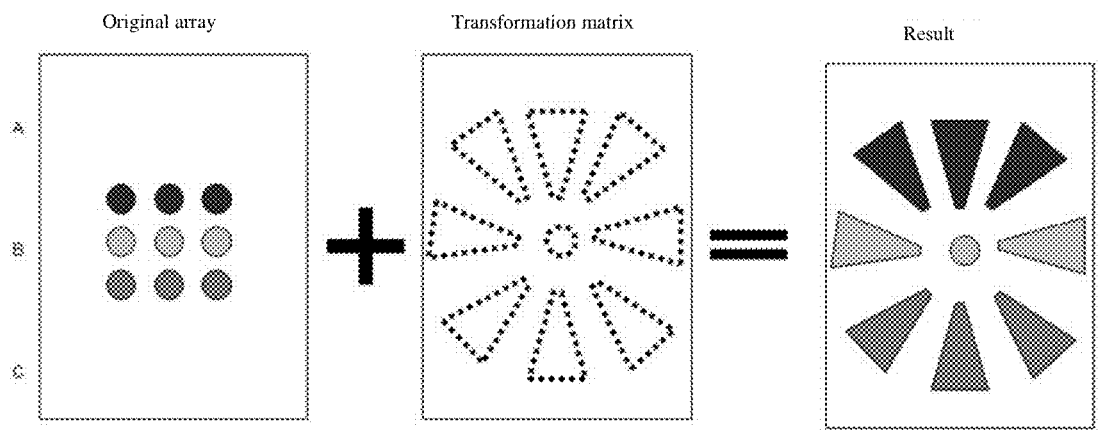
Figure 11:
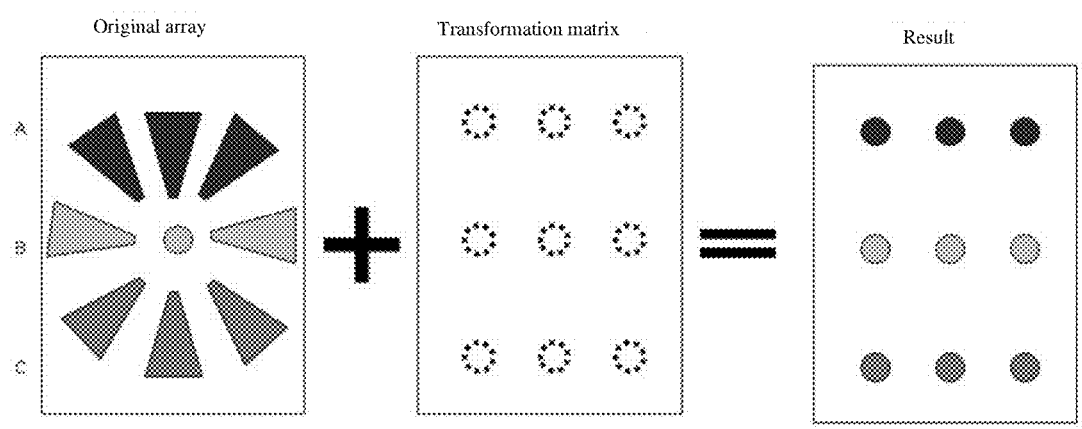
Figure 12:
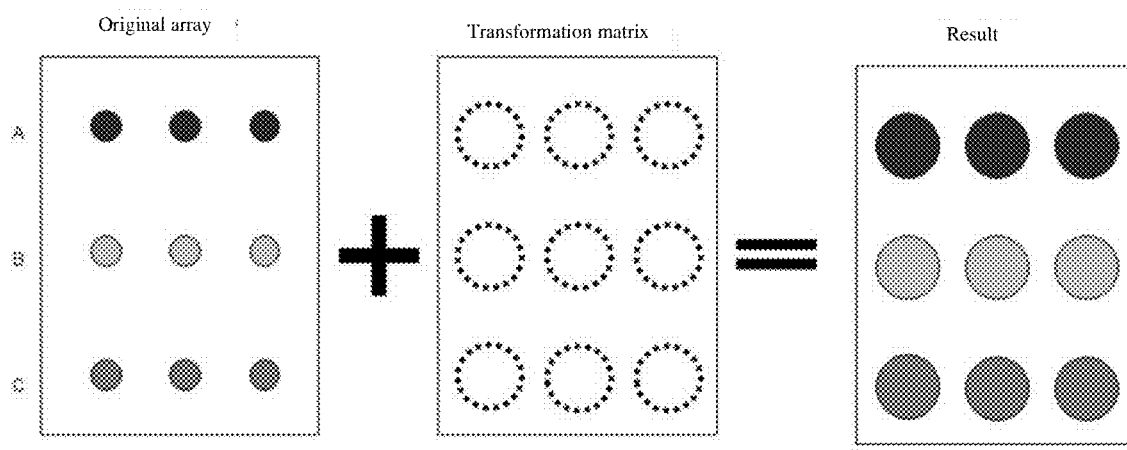
Figure 13:
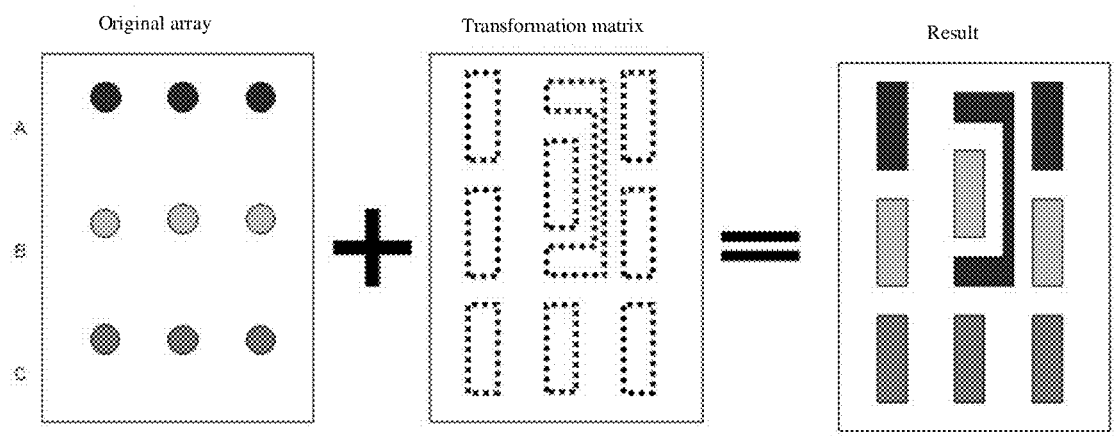
Figure 14:
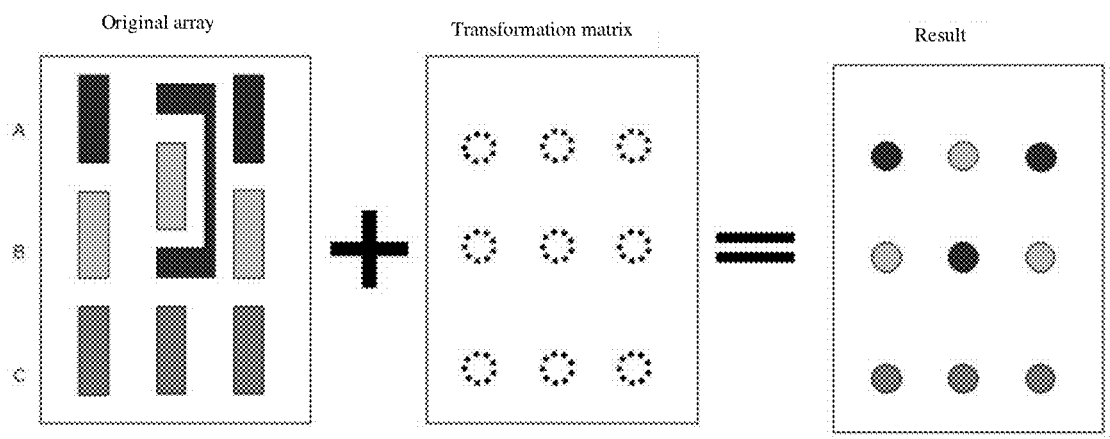
Figure 15:
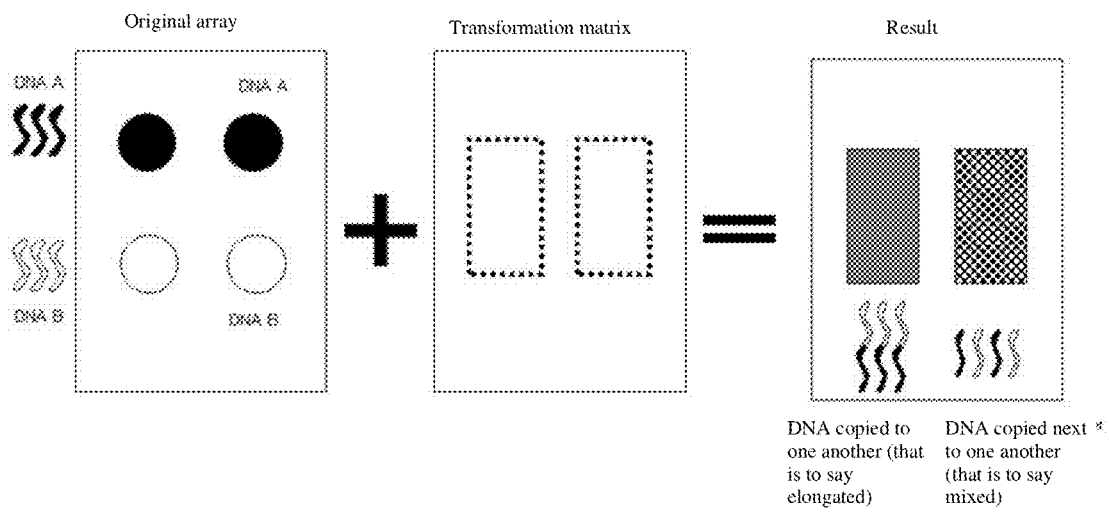
Figure 16:
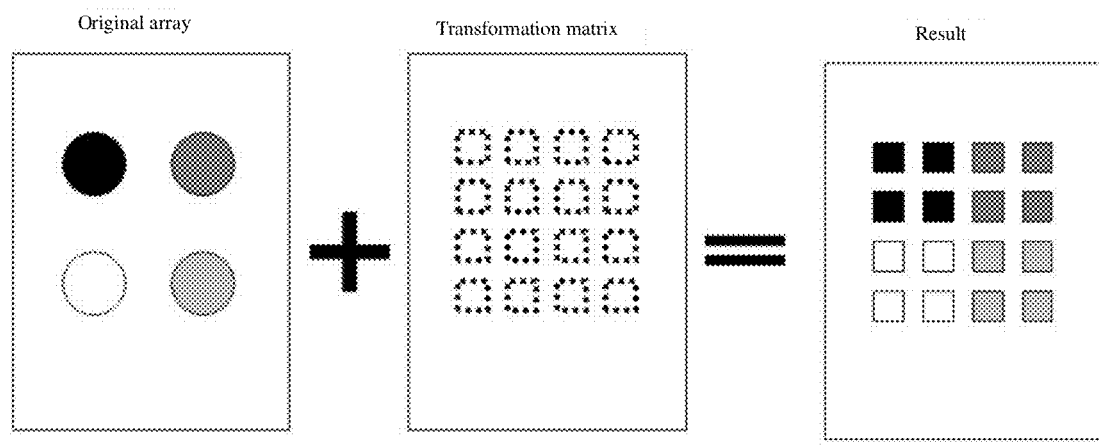
Figure 17:
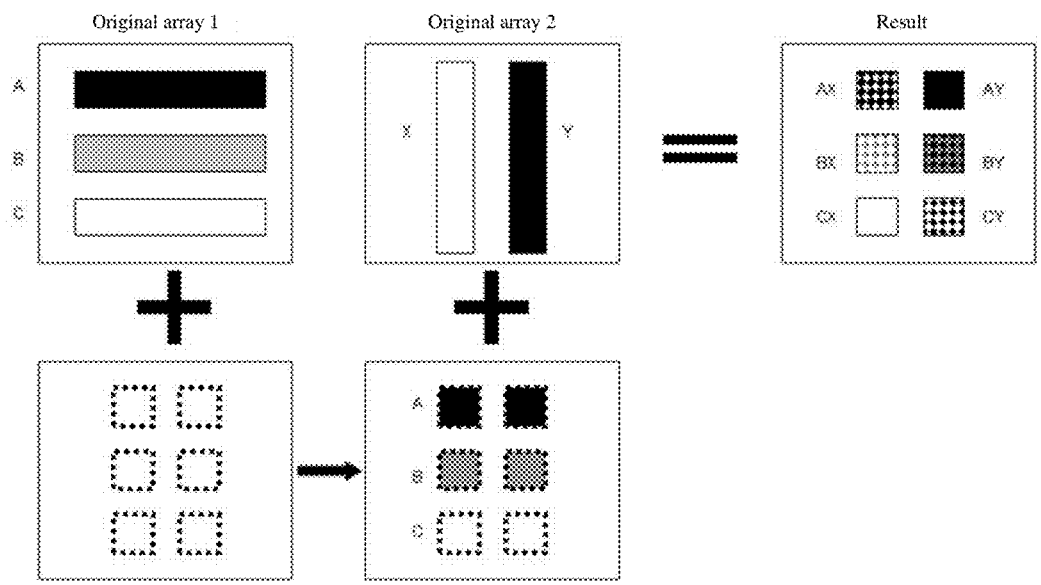
Figure 18:
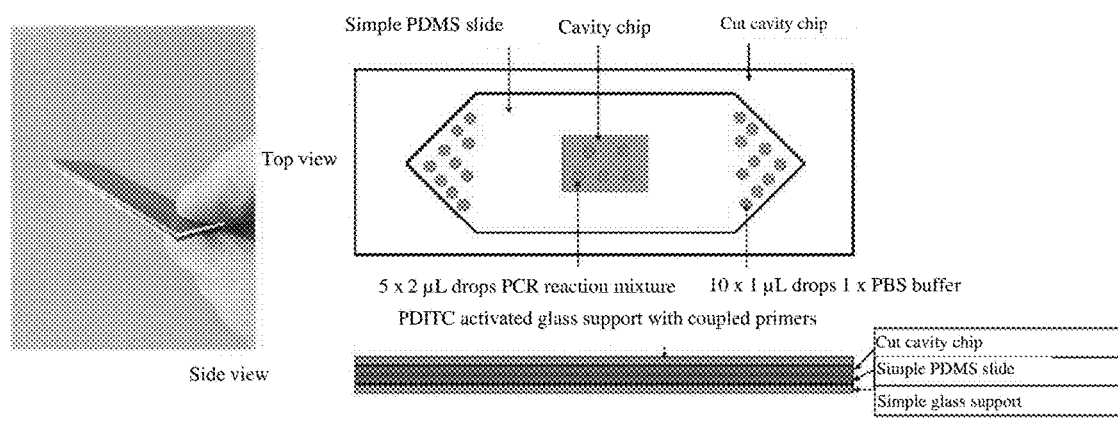
Figure 19:
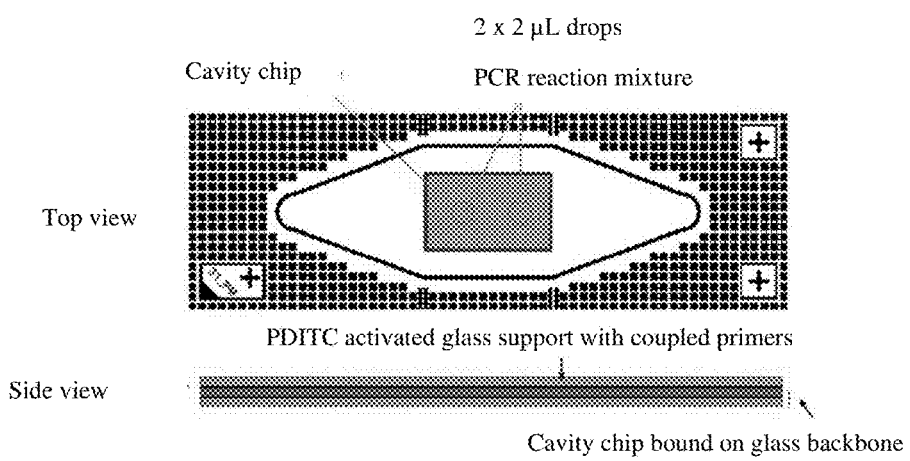
Figure 19:
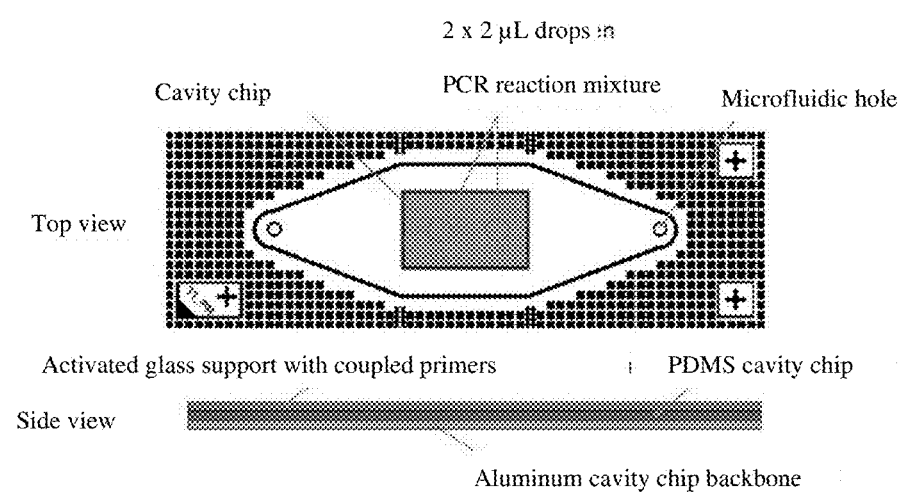
Figure 20:
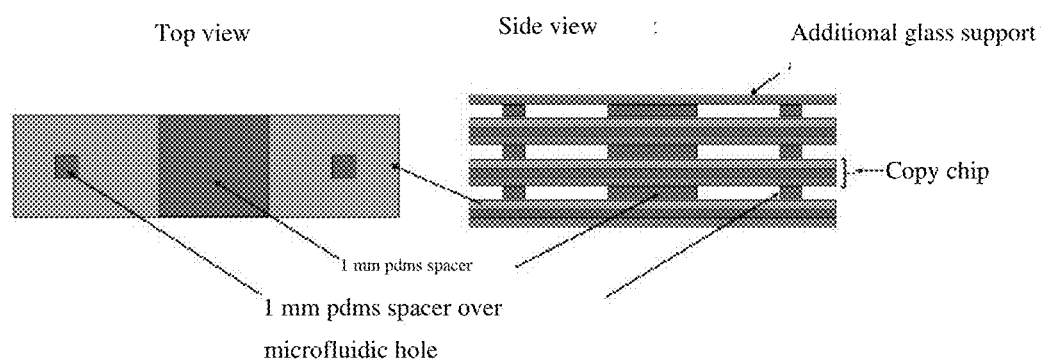
Figure 21:
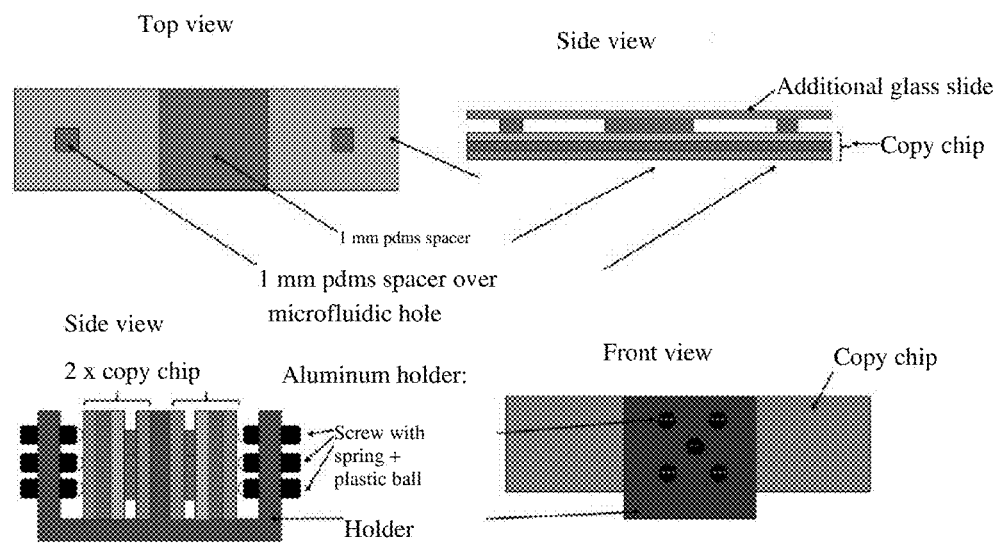
Figure 22:
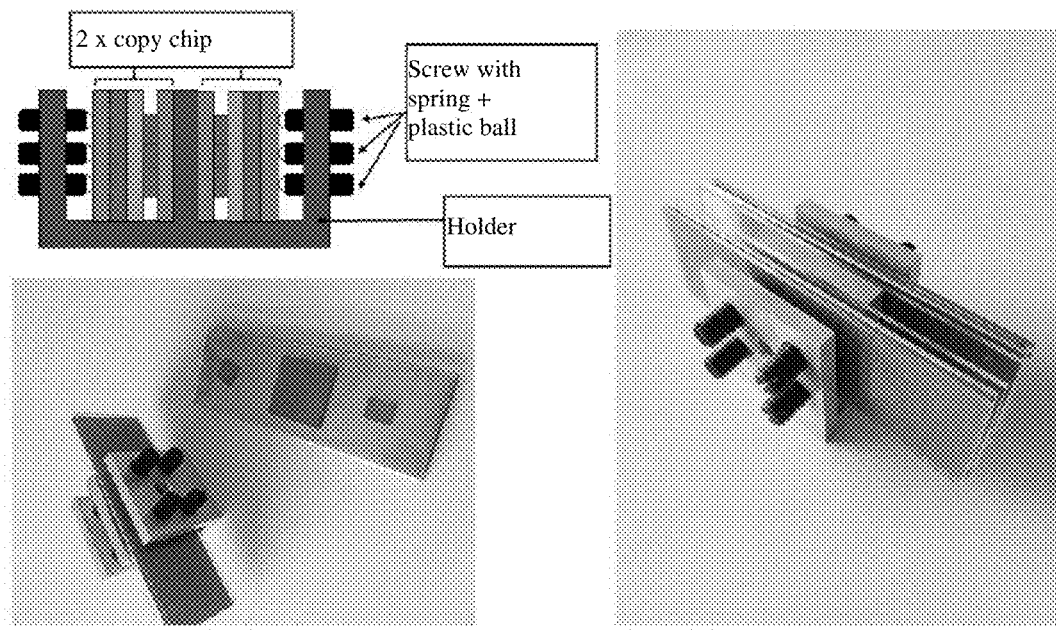
Figure 23:
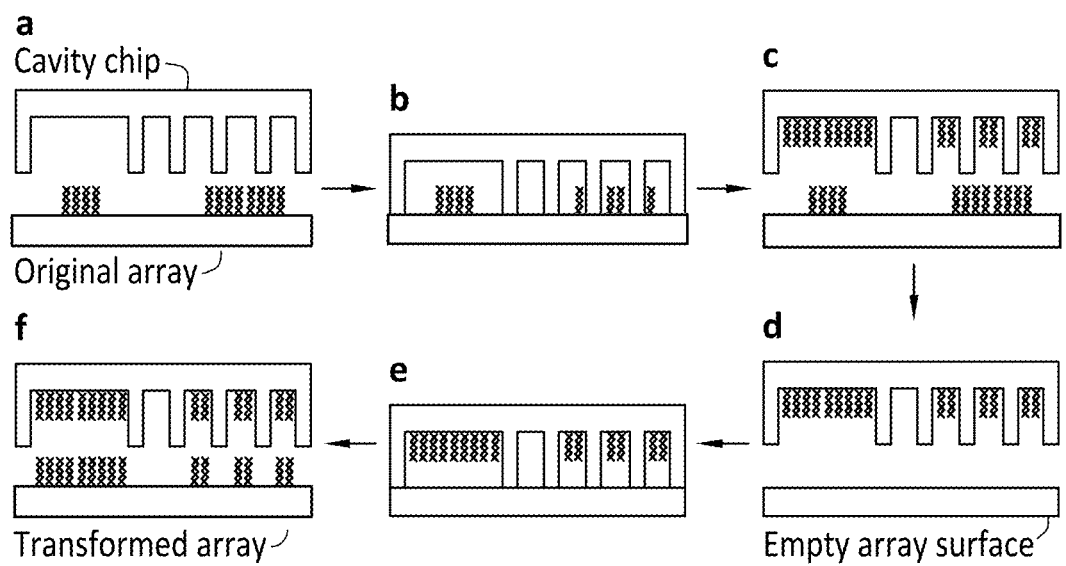

FIG. 23 shows a diagrammatic representation of a typical transformation process. The transformation of a small spot into a larger-area spot as well as the transformation of a large-area spot into 3 smaller spots is represented. a: Filling of the cavity chip with a reaction mixture, for example, PCR mixture or cell-free expression system and placement of the original array on the cavity chip. b: Performance of a copying reaction, for example, a PCR. c: Opening, washing and blocking of the chip. d: Filling of the cavity chip with reaction mixture and closing thereof by means of an empty array surface. e: Performance of a copying reaction, for example, a PCR. f: Washing and blocking of the newly formed array (transformed array) and of the cavity chip.

Figure 24:
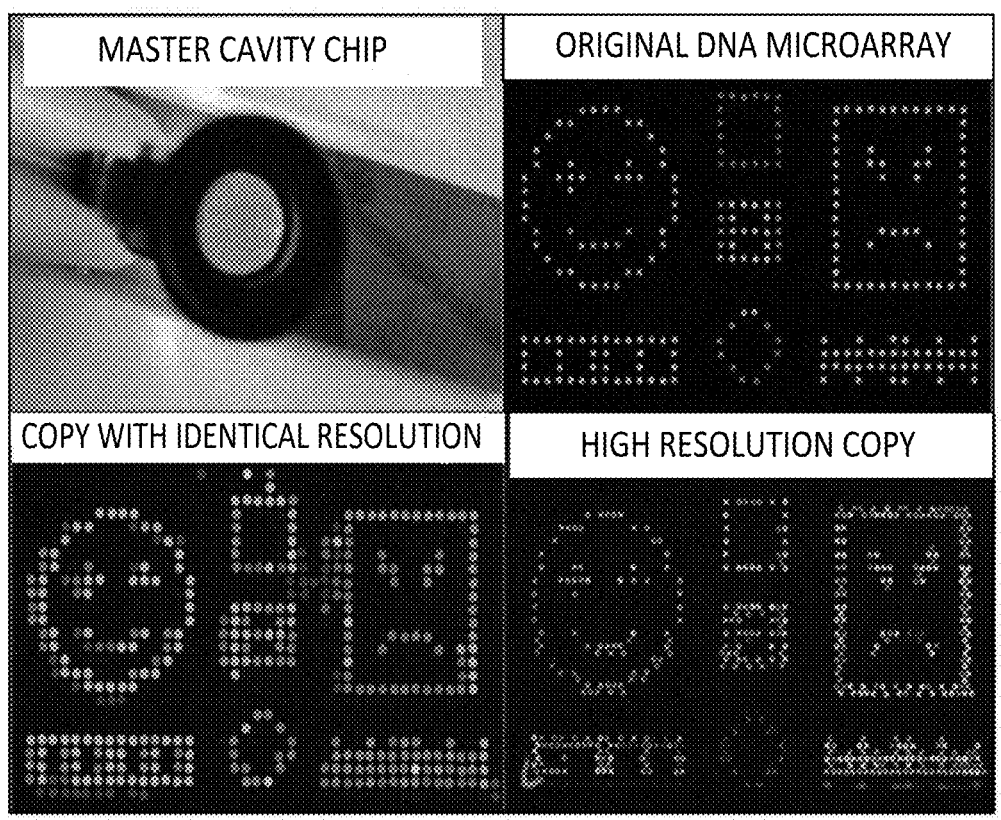

FIG. 24 shows an additional example of a possible application.

ABBREVIATIONS AND EXPLANATIONS

Transfer chip Also referred to as cavity chip; device which can be used for stationary storage of biomolecules
Primary array Also referred to as template array; microarray which is used as starting point and which has been prepared according to the current state of the art; preferably DNA or RNA array
Secondary array Microarray which is produced after an array transformation is performed. It represents the final result of the array transformation.
ST Spatial transformation—Change of the information on the position and/or the geometry in comparison to the primary array
ST zoom Spatial transformation zoom—The position information is maintained; however, the spots are represented either enlarged or reduced.
ST rotation Spatial transformation rotation—Rotation of the primary array around certain point and by certain angle (in addition to the shift)
ST shift Spatial transformation shift—Position change of the array in comparison to the starting array
ST stretch Redundancy for shape transformation
ST merging Adding or connecting of new information to already existing information. The constitution of the original information is not changed in the process.
ST resolution Spatial transformation resolution change; increase or reduction of the number of spots compared to the starting array
ShaT Shape transformation—Change of the original shape of the array spots of the primary array
SeqT Sequence transformation—Change of the biomolecules compared to the primary array
(additive) SeqT addition Sequence transformation which enables the addition of new information to the already existing information
(subtractive) SeqT Sequence transformation which enables the partial or subtraction complete removal of information In accordance with the theory of affine and partially affine mappings from mathematics, all the transformations used can be bijective, injective and/or surjective and in addition additive, subtractive or identical. The following meanings apply here:

Bijective: Each cavity of the transfer chip encounters exactly one spot of the primary array. No spots are left out.
Injective: The cavities of the transfer chip encounter in each case one spot of the primary array. Spots may be left out.
Surjective: Each cavity of the transfer chip encounters one or more spots of the primary array. No spots are left out.

REFERENCES

1. Kishawi, Iman: Agilent Array Technology and Custom Capabilities, Agilent Technologies, October 2008, pages 1-53
2. LeProust, Emily: Agilent's Microarray Platform: How High-Fidelity DNA Synthesis Maximizes the Dynamic Range of Gene Expression Measurements, Agilent Technologies, Dec. 21, 2015, pages 1-12
3. Blanchard, A. P., Kaiser, R. J.; Hood, L. E.: High-density oligonucleotide arrays, Biosensors & Bioelectronics, Vol. 11, No. 6/7, 1996, pages 687-690
4. Lin, H., Sun, L., Crooks, R. M.: Replication of a DNA Microarray, CHEM. SOC. 9 VOL. 127, NO. 32, Jul. 23, 2005, pages 11210-11211
5. Kim, J., Crooks, R. M.: Parallel Fabrication of RNA Microarrays by Mechanical Transfer from a DNA Master, Anal. Chem., Oct. 27, 2007, pages 8994-8999
6. Kim, J., Crooks, R. M.: Replication of DNA Microarrays Prepared by In Situ Oligonucleotide Polymerization and Mechanical Transfer, Analytical Chemistry, Vol. 79, No. 19, Oct. 1, 2007, pages 7267-7274
7. Lin, H. et al.: Replication of DNA Microarrays from Zip Code Masters, CHEM. SOC. Vol. 128, No. 10, Feb. 18, 2006, pages 3268-3272
8. De Risi, J., et al.: Use of a cDNA microarray to analyse gene expression patterns in human cancer, Nat. Genet., December 1996, pages 457-460.
9. Nuwaysir, E. F., et al.: Gene Expression Analysis Using Oligonucleotide Arrays Produced by Maskless Photolithography, Genome Research, Apr. 16, 2002, pages 1749-1755
10. Pease, A. C., et al.: Light-generated oligonucleotide arrays for rapid DNA sequence analysis, Proc. Natl. Acad. Sci. USA, Vol. 91, Biochemistry, May 1994, pages 5022-5026
11. Yu, A. Amy et al.: Supramolecular Nanostamping: Using DNA as Movable Type, Nano Letters 2005, Vol. 5, No. 6, Mar. 14, 2005, pages 1061-1064
12. Yu, A., Stellacci, F.: Contact Printing Beyond Surface Roughness: Liquid Supramolecular Nanostamping, Advanced Materials, 2007, pages 4338-4342

The invention claimed is:

1. A method for microarray transformation comprising:
    a) providing a template array, wherein the template array comprises multiple spots comprising RNA or DNA template molecules wherein the multiple spots have a first shape, a first size and a first position of the multiple spots on the template array,
    b) providing a cavity chip comprising a transfer matrix comprising an array surface including an arrangement of cavities,
    c) providing a reaction mixture in the cavities of the cavity chip, and
    d) subsequent to c), placing the template array onto the cavity chip, and
    e) copying the RNA or DNA template molecules of the multiple spots of the template array onto the cavity chip resulting in spots in the cavities of the cavity chip so that the cavities comprise the RNA or DNA template molecules and the reaction mixture, f) providing a second array surface, g) repeating c), h) subsequent to g), placing the second array surface of f) onto the cavity chip, i) copying the spots of e) of the cavity chip onto the second array surface resulting in a second array comprising, multiple spots on the second array having a second shape, a second size and a second position, wherein at least one of the second shape, second size and second position of the multiple spots on the second array differs from the first shape, first size and first position of the multiple spots on the template array, wherein the second position on the second array comprises a spatial transformation shift relative to the first position on the template array.

2. The method according to claim 1, wherein the spots on the second array comprise DNA, RNA or protein and result from a modification, elongation, shortening, derivatization and/or inversion of the RNA or DNA template molecules (i) during the copying according to 1e), (ii) during the copying according to 1i), or a combination of (i) and (ii).

3. The method according to claim 1, wherein a) to e) are repeated at least once, wherein the cavity chip of b) and (iii) a further template array which is not the template array of a) is used in repeating a) to e), or iv) the template array of a) is placed in d) onto the cavity chip of b) in a first orientation and is used in repeating a) to e) but in a second orientation that differs from the first orientation.

4. The method according to claim 1, wherein the copying according to 1e), 1i), or 1e) and 1i) comprises an amplification.

5. The method according to claim 1, wherein the reaction mixture is a PCR mixture, an isothermal amplification mixture, a reverse transcription mixture, a transcription mixture or a cell-free expression mixture.

6. The method according to claim 1, wherein the RNA or DNA template molecules are oligonucleotides.

7. The method according to claim 1, wherein the cavities of the cavity chip are coated with primers comprising DNA sequences having a 5' end and a 3' end.

8. The method according to claim 7, wherein the primers, on the 3' end or on the 5' end, carry a DNA sequence in addition to the DNA sequences of the primers.

9. The method according to claim 1, wherein the arrangement of the cavities causes multiple of the multiple spots of the template array to merge on the second array.

10. The method according to claim 1, wherein a) to e) are repeated with the cavity chip of b), but providing a further template array comprising multiple spots comprising further RNA or DNA template molecules, wherein spots of at least the template array and the further template array are merged in the second array.

11. The method according to claim 1, wherein the arrangement of the cavities causes at least one of the multiple spots of the template array to be subdivided into multiple spots on the second array.

12. The method according to claim 1, wherein the multiple spots comprise DNA template molecules and DNA sequences are added to the reaction mixture in c) resulting in an elongation of the DNA template molecules.

13. The method according to claim 1, wherein the RNA or DNA template molecules are DNA template molecules and wherein all or some of the DNA template molecules comprise identical DNA sequences of 10-30 base pairs.

14. The method according to claim 8, wherein position information of the primers is gathered via the DNA sequence.

15. The method according to claim 1, wherein the second array differs from the template array in one or more of the following: spot shape, spot size or combinations thereof.

* * * * *